Figure 1:
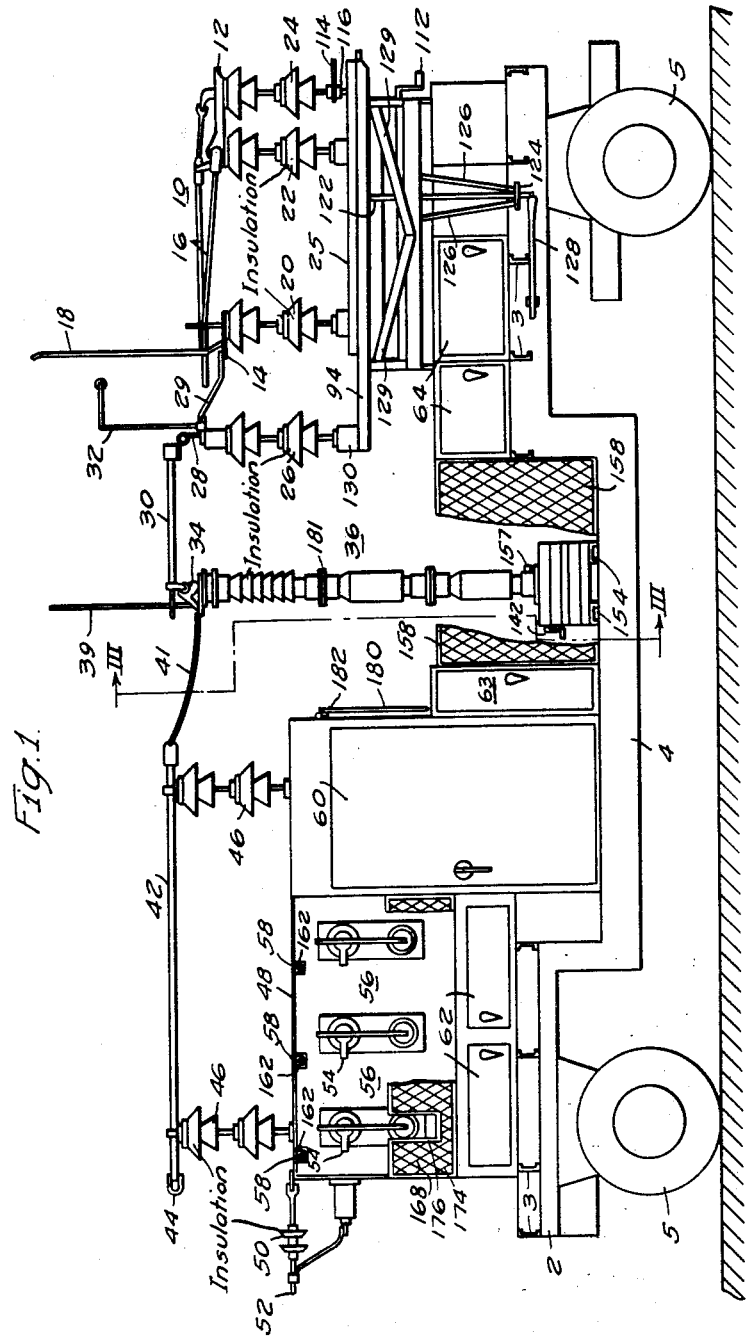

May 8, 1951 K. A. KEPPLE ET AL 2,551,841
ELECTRICAL APPARATUS

Filed Nov. 27, 1946 6 Sheets-Sheet 2

WITNESSES:
E.A.M?Closkey.
Q.T.Stratton

INVENTORS
Kenneth A.Kepple and
Elmer A.Rothfus.
BY
Ralph H.Swingle
ATTORNEY

May 8, 1951 K. A. KEPPLE ET AL 2,551,841
ELECTRICAL APPARATUS
Filed Nov. 27, 1946 6 Sheets-Sheet 3
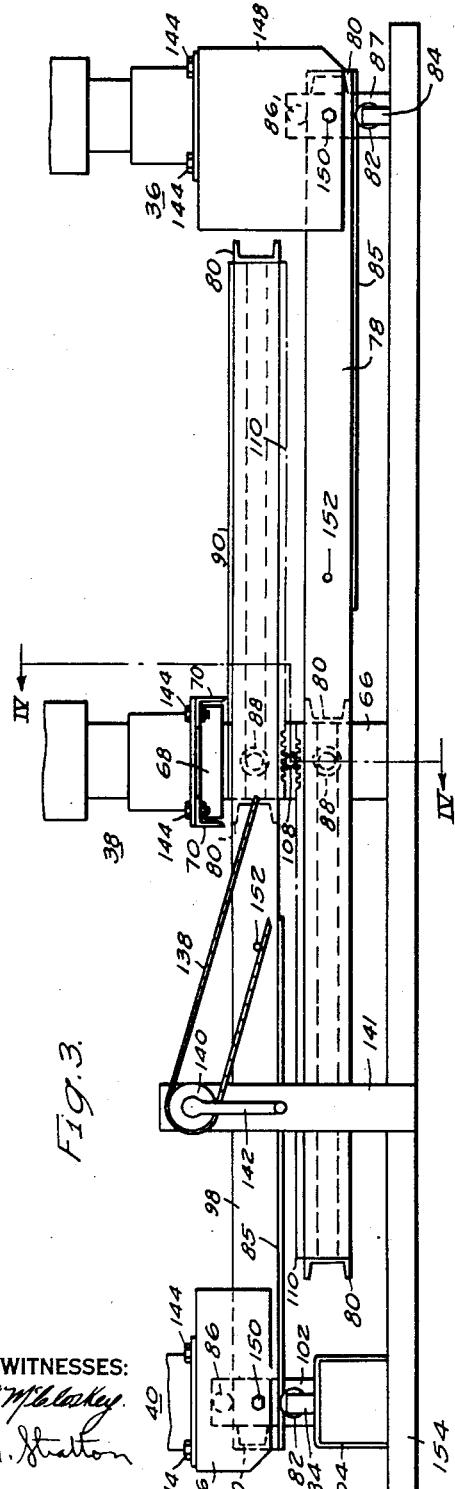
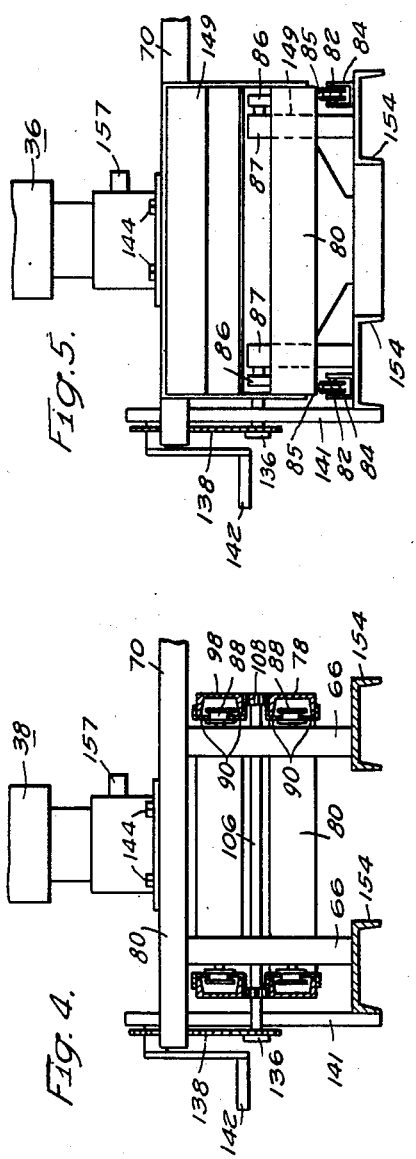
INVENTORS
Kenneth A. Kepple and
Elmer A. Rothfus.
BY
Ralph H. Swingle
ATTORNEY

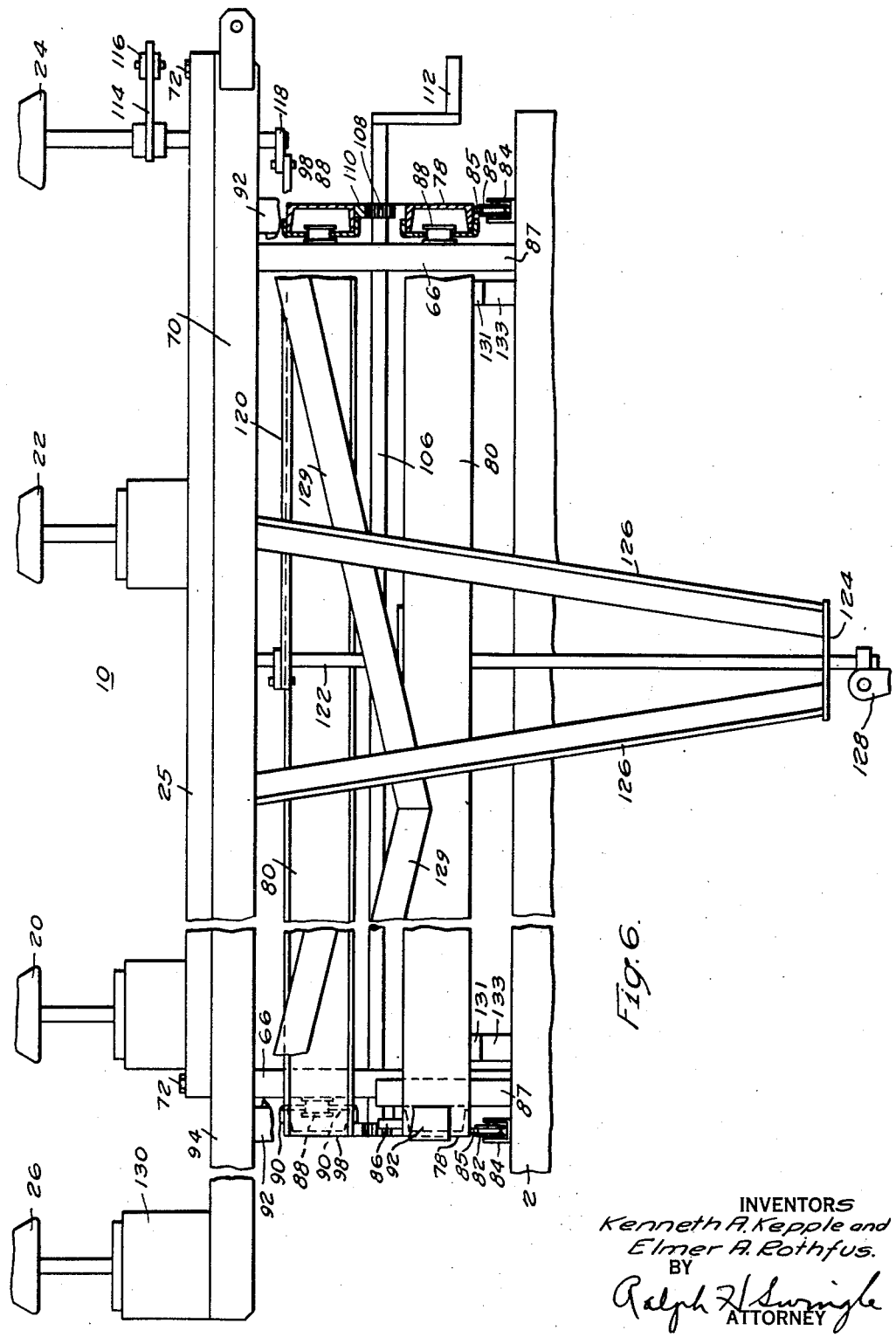

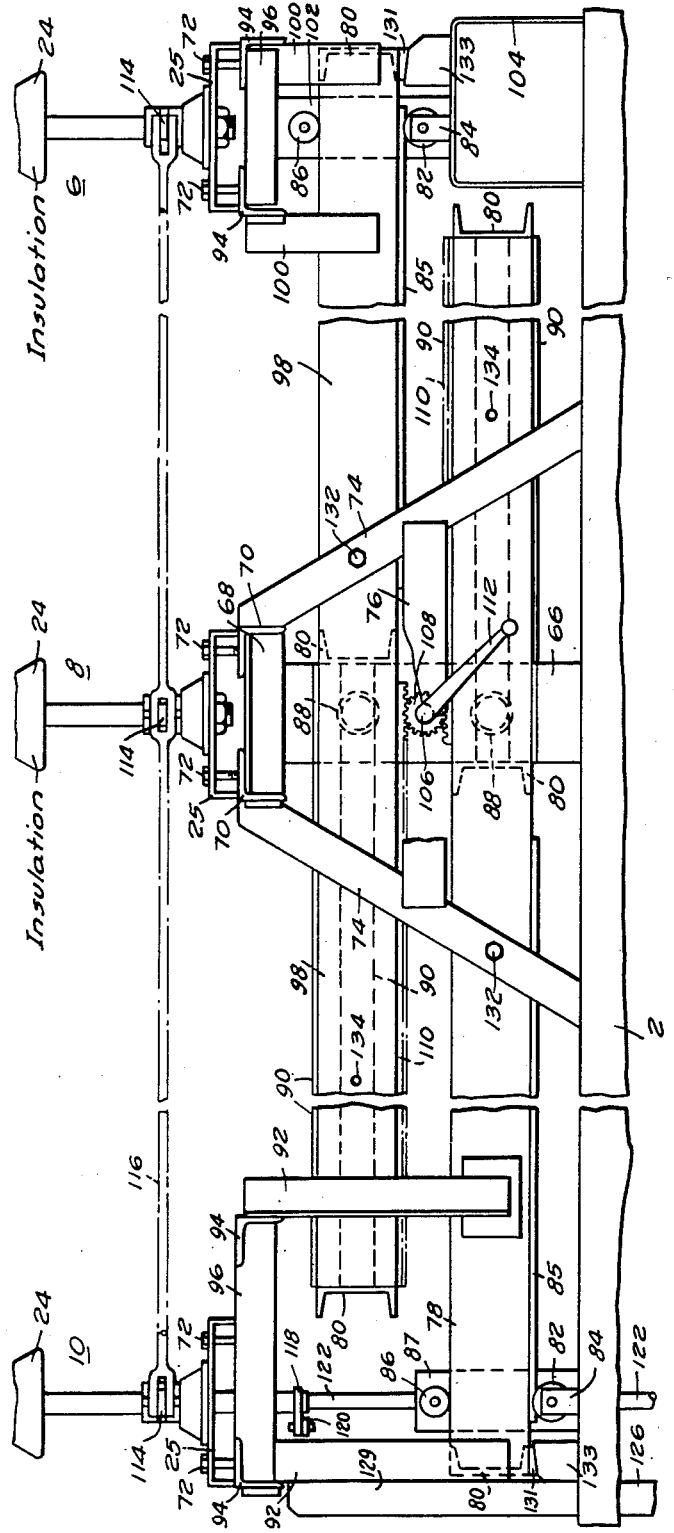

May 8, 1951  K. A. KEPPLE ET AL  2,551,841
ELECTRICAL APPARATUS

Filed Nov. 27, 1946  6 Sheets-Sheet 6

WITNESSES:
E. A. M'Closkey
Q. T. Stratton

INVENTORS
Kenneth A. Kepple and
Elmer A. Rothfus.
BY Ralph W. Swingle
ATTORNEY

Patented May 8, 1951

2,551,841

UNITED STATES PATENT OFFICE 2,551,841

ELECTRICAL APPARATUS

Kenneth A. Kepple, Jeannette, Pa., and Elmer A. Rothfus, Jackson, Mich., assignors to Westinghouse Electric Corporation, East Pittsburgh, Pa., a corporation of Pennsylvania Application November 27, 1946, Serial No. 712,588

20 Claims. (Cl. 175—298)

This invention relates to electrical apparatus generally, and more particularly to a portable arrangement of such apparatus.

While portable or mobile power plants and substations have been used satisfactorily in the past, such use has been limited to relatively low voltages, one reason being that the clearances between poles required at higher voltages for certain apparatus adds up to an amount that is greater than clearances permitted on highways and railroads. Since a number of different pieces of electrical apparatus are usually mounted along the length of a vehicle of this type, so that the direction of current flow is generally longitudinally of the vehicle, the interpole clearances extend generally transversely of the vehicle. Furthermore, in order to conserve space it is desirable to mount certain live parts of electrical apparatus on the sides of the vehicle, and the problem is then presented of providing safety guards for such parts and still maintain permissible clearances.

Accordingly, one object of this invention is to provide a novel arrangement and mounting of electrical apparatus on a vehicle such that adequate right-of-way clearances are provided during transit, and yet increased electrical clearances and safeguards may be obtained during operation of the apparatus.

Another object of this invention is to provide a novel portable mounting for multi-pole electrical apparatus wherein operating means are provided for simultaneously increasing or decreasing the interpole spacing.

Another object of this invention is to provide a novel arrangement of multi-phase electrical apparatus mounted on a vehicle wherein the phase conductors extend generally longitudinally of the vehicle, and wherein certain of said apparatus and accessories are retractably mounted in a direction transversely of said vehicle.

Another object of this invention is to provide for apparatus mounted on a vehicle and which may be retractable in a direction transversely of the vehicle, novel guard means for such apparatus which is retractable in the same general direction.

Figure 2:
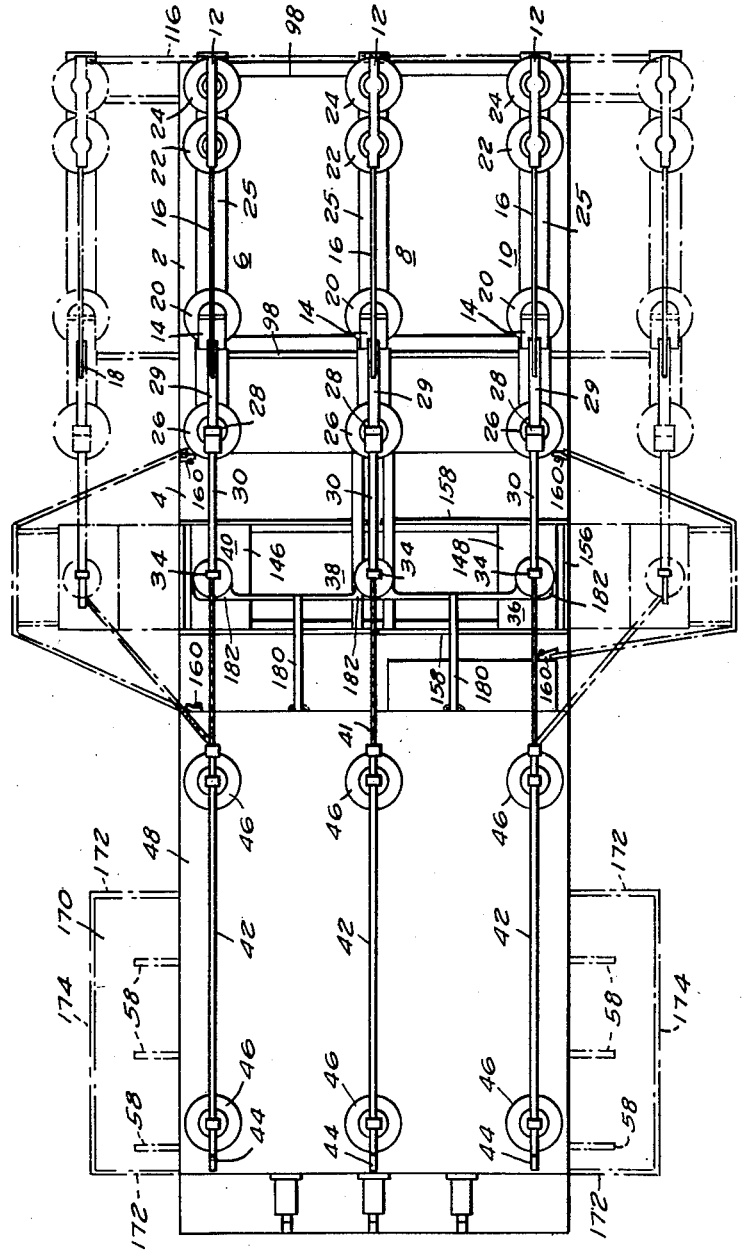

These and other objects of this invention will be apparent upon consideration of the following detailed description of a preferred embodiment thereof, when taken in connection with the attached drawings, in which:

Figure 1 is a side elevation view with certain parts broken away, illustrating a vehicle having electrical apparatus mounted thereon in accordance with this invention, Fig. 2 is a top view of the device shown in Fig. 1, with the operative position of certain of the apparatus being shown in dot-dash lines, Fig. 3 is an enlarged side elevation view of the mounting for the lightning arresters shown in Fig. 1, looking in the direction of the arrow 3 in Fig. 1.

Figure 8:
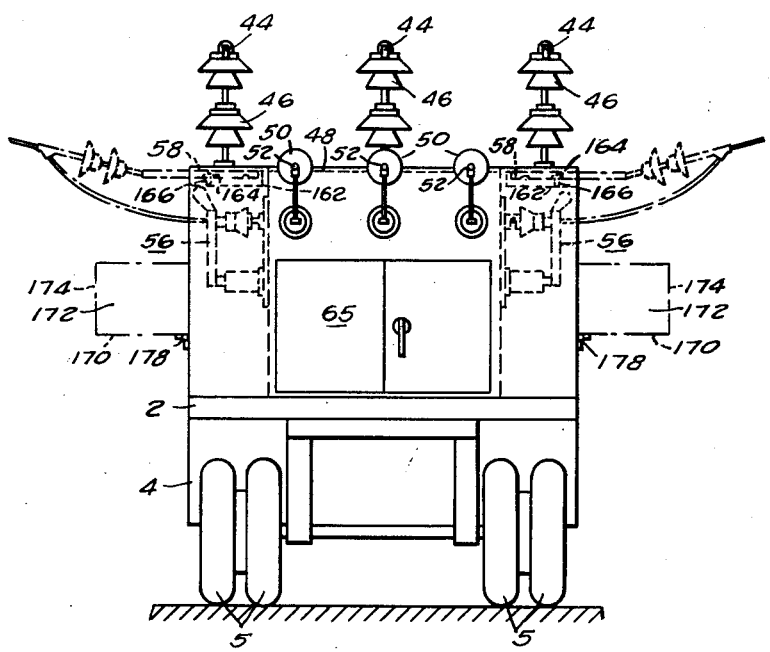
Figure 9:
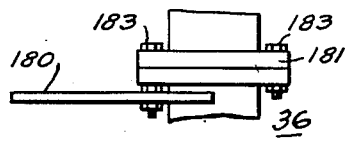

Fig. 4 is a sectional view of the arrester mounting shown in Fig. 3, and taken substantially on the line IV—IV of Fig. 3, Fig. 5 is an end view of the arrester mounting shown in Figs. 3 and 4, Fig. 6 is an enlarged end view of the mounting for the disconnect switches shown in Figs. 1 and 2, Fig. 7 is a side elevation view with certain parts broken away of the disconnect switch mounting shown in Fig. 6, Fig. 8 is an end view of the device shown in Fig. 1 looking from the left of Fig. 1, and Fig. 9 is a partial elevation view of a lightning arrester and its bracing means.

The particular embodiment of the invention disclosed herein is illustrated as being mounted on a vehicle having a bed or chassis 2 supported on wheels 5 adapted for operation as a trailer to be hauled on highways. It is to be understood that this invention is not limited for use with this particular type of vehicle, because it was previously pointed out that the invention is adapted for any type of vehicle whether intended for movement on highways, railroads, or the like. The bed 2 of the vehicle illustrated is preferably provided with a downwardly offset central portion 4 for supporting certain of the taller pieces of electrical apparatus, as will be hereinafter pointed out and may also include supporting channels 3.

The particular electrical apparatus herein illustrated as being mounted upon bed plate 2 of the vehicle is in the nature of the sub-station equipment, especially electrical protective apparatus. While certain features of this invention are particularly related to the arrangement and mounting of certain types of electrical protective apparatus, it is to be further understood that the invention is not to be limited to the particular apparatus illustrated as being mounted on the bed 2 of the vehicle, inasmuch as it will be obvious that other apparatus may also be included on the same vehicle in addition to or in place of certain of the apparatus disclosed herein. The vehicle illustrated on the drawings as carrying electrical protective apparatus is adapted for use in conjunction with another vehicle carrying other electrical apparatus, such as transformers and the like, and might also be used with portable electrical generating equipment as well.

The apparatus illustrated as being mounted on the bed 2 of the vehicle illustrated in Figs. 1, 2, and 8 is embodied in a three-phase circuit, and high-voltage power supply conductors are adapted to be connected to the end terminals 12 of disconnect switches 6, 8 and 10 located at the right-hand end of the vehicle, as viewed in Fig 1, with the switches spaced in a direction transversely of the vehicle. Each of the disconnect switches has the incoming terminal 12 at the outer end thereof mentioned above, and is provided with a second terminal 14, with the two terminals being bridged by a multiple blade structure 16 mounted on terminal 12 for movement into and out of engagement with a contact on the second terminal 14. If desired, an arc horn 18 may be provided on the terminal 14 of each switch. Each of the disconnect switches is mounted on a pair of spaced stationary insulator structures 20 and 22, and each further includes a rotatable insulator structure 24 adapted upon rotation thereof to move blade structure 16 to and away from closed circuit position. The insulator structures 20, 22 and 24 are generally mounted as a unit on a channel base support 25, which, in turn, is adapted to be mounted on the vehicle in a manner to be described. Any desired type of high voltage disconnect switch may be employed, that shown herein merely for purposes of illustration being of the type shown in H. J. Crabbs Patent 2,067,659, issued January 12, 1937 to the same assignee as this application.

The high-voltage supply circuit to the vehicle continues from terminal 14 of each disconnect switch by means of a conductor 29 to a fuse contact 28 mounted on an insulator structure 26 secured on the vehicle in a manner to be described. A fuse 30 is adapted to be mounted on each contact 28 for movement into and out of engagement with an oppositely located terminal 34 provided on the upper end of each of three lightning arresters 36, 38 and 40. Fuse 30 is adapted for manual operation on its supporting contact 28 into and out of engagement with terminals 34, and the supporting contact 28 may include a fuse supporting rod 32 adapted to support the fuse in the open circuit position. The terminals 34 of the lightning arresters may also include arc horns 39 which are cooperable with the outer terminals of fuses 30 when they are moved to open circuit position to assist in extinguishing the arc. Lightning arresters 36, 38 and 40 are adapted to be supported at their lower ends on the bed 2 of the vehicle in a manner which will be hereinafter more particularly described. The high-voltage supply circuit continues from terminals 34 of the lightning arresters by flexible conductors 41 to rigid bus bars 42, which have at their outer ends adjacent the left-hand end of the vehicle as viewed in Fig. 1, outgoing terminals 44. Bus bars 42 are preferably supported on spaced insulator structures 46 mounted on top of a housing structure 48 supported on bed 2 of the vehicle.

The apparatus and circuit described above as being included in the structure mounted on bed 2 of the vehicle illustrated on the drawings relates, as indicated, to a high-voltage supply circuit. There is also supported on the vehicle apparatus included in a lower voltage distribution circuit which comes to the vehicle, by way of conductors 52 supported by dead end insulators 50 mounted on the upper outer corner of housing structure 48. The distribution circuit proceeds from conductors 53 through the housing structure which may include other electrical apparatus, such as circuit breakers and the like, to disconnect switches 56 mounted on each side of housing structure 48, and through these switches to switch terminals 54, from which distribution conductors may be taken off from the vehicle and be supported thereon from dead end brackets 58 mounted on opposite sides of housing structure 48 adjacent the top thereof. Disconnect switches 56 are illustrated as being of a conventional type having movable blades pivotally mounted at their lower ends for movement into and out of engagement with upper contacts having the terminals 54 associated therewith.

As shown in Fig. 1, the vehicle illustrated may have a number of compartments for housing other electrical apparatus, tools and accessories which are needed for servicing and maintaining the apparatus contained on the vehicle. Thus a relatively large compartment 60 may be provided for a circuit breaker, and other smaller compartments 62, 63, 64 and 65 may be provided for tools and accessories.

Having described generally the apparatus mounted on bed 2 of the vehicle and the circuits in which such apparatus is included, the details of the mountings and manner of supporting such apparatus and accessories will now be described. Disconnect switches 6, 8 and 10 are supported on a structure more clearly illustrated in Figs. 6 and 7 of the drawings which comprises spaced upright channel members 66 located substantially centrally of the vehicle with these upright channels being secured at their lower ends to bed 2 of the vehicle and having at their upper ends cross angle members 68 which are connected by angled tie members 70 to which is bolted the supporting base 25 of switch 8, as by bolts 72.

Preferably, this supporting structure is adapted to be braced by angle brace members 74 secured at each side to the angled tie members 70 and which diverge downwardly to be secured to bed 2 of the vehicle. Angled braces 74 may have a tie plate 76 connecting them intermediate their ends. It will be apparent from the foregoing that disconnect switch 8 is stationarily mounted on bed 2 of the vehicle.

The outside poles 6 and 10 of the disconnect switch structure are adapted to be mounted for movement relative to the vehicle and to central pole 8, in a direction substantially transversely of the vehicle. Thus, disconnect switch 10 is adapted to be supported on spaced carriage channels 78 which may be connected at their ends and at an intermediate point by tie channel members 80. The carriage channels 78 are adapted to be supported at their outer ends by grooved rollers 82 rotatably mounted on supporting brackets 84, with the grooved rollers adapted to receive track strips 85 secured to the underside of each carriage channel 78, at least for a substantial distance inwardly from the outer ends of the channels. Moreover, plain rollers 86 are adapted to be supported from bed 2 of the vehicle by supporting plates 87 in a position to engage the upper sides of carriage channels 78 substantially directly above the grooved rollers 82. Carriage channels 78 are further supported at a point substantially midway between the sides of the vehicle by grooved rollers 88 mounted on supporting channels 66 for disconnect switch 8, with these rollers adapted to receive track flanges comprising one flange of an angle member 90, the other flange of which is secured to a flange of carriage channels 78. The angle members 90 extend along carriage channels 78 from the outer ends thereof somewhat beyond the centers of the channels, there being an angle member 90 attached to each flange of each carriage channel 78, so that their track flanges extend into grooved rollers 88 from both above and below. Disconnect switch 10 is supported from carriage channels 78 by angled supports 92 secured to each carriage channel in spaced relation at their lower ends, and having tie angles 94 connecting the supporting angles 92 of the two carriage channels 78, and these, in turn, being connected by angle members 96 to which the supporting channel base 25 of switch 10 is adapted to be bolted as by bolts 72. Supporting angles 92 are preferably braced by diagonally extending angle braces 129, and tie angles 94 are provided with supports 130 for insulators 26.

Disconnect switch 6 is adapted to be supported in a manner similar to disconnect switch 10, by spaced carriage channels 98 which are mounted directly above carriage channels 78, respectively. The outer ends of channels 98 are supported by grooved rollers 82 and rollers 86 in the same manner as channels 78, with roller 82 being supported on a supporting channel structure 104, and roller 86 being mounted on a supporting channel 102. The disconnect switch is adapted to be mounted on the outer end of carriage channels 98 and supported by supporting angled members 100 projecting upwardly from the carriage channels for supporting tie and connecting angled members 94 and 96 with the latter receiving the bolts 72 which secure channel base 25 of disconnect switch 6 thereto. Carriage channels 98 are supported substantially centrally of the vehicle by grooved rollers 88 identical with those supporting carriage channels 78.

For the purpose of simultaneously moving carriage channels 78 and 98 inwardly and outwardly with respect to the sides of the vehicle, there is provided a drive shaft 106 rotatably mounted in supporting channels 66 for disconnect switch 8, which shaft is provided with pinions 108 secured thereon at points intermediate carriage channels 78 and 98. The opposed pairs of carriage channels 78 and 98 have secured to the upper surface of channels 78 and to the lower surface of channels 98, rack strips 110 provided with teeth positioned to mesh with opposite sides of each pinion 108. Shaft 106 is provided with a manually operable drive crank 112 at the end thereof which projects at the right-hand end of the vehicle, as viewed in Fig. 1.

As previously described, each disconnect switch is provided with a rotatable insulator structure 24 which includes a shaft portion rotatably mounted in a bearing provided in the channel base 25 of each switch. Each of such rotatable insulator structures carries an actuating crank 114, and these cranks are adapted to be connected by a connecting rod structure 116 when the outer poles 6 and 10 of the switches are at a position wherein they extend beyond the sides of the vehicle (dotted line position of Fig. 2). The connecting rod structure 116 is for the purpose of causing the disconnect switches to operate in unison to open and close the circuit. The switches are operated by means of a crank 118 formed on an extension of the rotatable insulator structure of disconnect switch 10, and this, in turn, is connected by an actuating link 120 to an operating shaft 122 supported from carriage channels 78 for switch 10, by a bearing plate 124 supported by angle members 126 at a position below the switch structure. An operating handle structure 128 may be pivotally mounted on operating shaft 122 below bearing plate 124 if desired, and this may be swung laterally of shaft 122 out of the way when the vehicle is in transit (Fig. 1). It will be noted that carriage channels 78 and 98 also each support an insulator structure 26 for fuse contacts 28.

It is apparent from the foregoing that the two outside poles 6 and 10 of the disconnect switch structure being mounted on carriage channels 98 and 78, respectively, may be moved laterally of the vehicle from the positions shown in full lines in Figs. 2 and 7, wherein they are adapted for transit when the vehicle is being moved from one location to another, to the dot-dash line positions shown in Fig. 2, wherein sufficient electrical clearance between poles is obtained for operation of the equipment. It is apparent that when the outer switch poles 6 and 10 are at their retracted or mobile positions at which they may be locked, as by bolts 132 passing through apertures formed in angle braces 74 and in carriage channels 78 and 98, so that they are immovable when the vehicle is in motion, when it is desired to operate the equipment mounted on the vehicle, switch poles 6 and 10 may be extended to obtain adequate clearance from switch pole 8 by removing lock bolts 132 and moving fuses 30 to their open circuit positions. Thereupon by moving crank 112 in a clockwise direction, as viewed in Fig. 7, the switch poles 6 and 10 will be simultaneously projected from the sides of the vehicle to their operative position determined by openings 134 provided in carriage channels 78 and 98, at which position they may be locked by reinserting bolts 132 in the apertures provided in angle braces 74 and the openings 134 in the carriage channels. It is apparent that by this type of switch mounting the outer poles may be moved inwardly to a position relatively close to the center switch pole 8 and within the confines of the vehicle's sides so as to provide adequate right-of-way clearances, while at the same time they may be extended a substantial distance outwardly to provide adequate electrical clearances between poles at high voltages, and that the extending and retracting operations can be performed on both poles simultaneously in a relatively simple manner merely by appropriately operating the crank 112. Simultaneous operation of both outside poles 6 and 10 has the further advantage of accurately positioning both of these poles simultaneously at the same distances from the central pole 8. As a further aid in making the movable switch structures rigid and immovable at their retracted positions, wedges 131 are provided on the undersides of carriage channels 78 and 98 for engagement with wedge members 133 mounted on bed 2 and on support 104 at the retracted positions.

Lightning arresters 36, 38 and 40 are mounted in a manner substantially identical with the disconnect switch mountings described above. Inasmuch as most of the parts of the arrester mounting are identical with those of the switch mountings previously described, these parts are identified on the drawings by like reference numerals, and will not be described in detail again in order to avoid undue repetition. The similarity in the arrester and disconnect switch mountings will be apparent upon comparison of Figs. 3 and 7, one difference being that operating shaft 106 instead of being provided with a crank 112 as in the disconnect switch mounting is provided with a sprocket wheel 136 which is adapted to be operated by a sprocket chain 138 engaging the wheel 136 and an operating wheel 140 supported by a channel support 141 on bed plate 2 of the vehicle, at a point substantially above carriage channels 78 and 98 and at one side of the vehicle, so as to be readily accessible for manual operation. Lightning arresters 36, 38 and 40 have flanged bases adapted to be secured, in the case of arrester 38, to tie angles 70 by bolts 144, and in the case of arrester 40, the bolts 144 engage a generally U-shaped support 146 mounted on carriage channels 98, while in the case of arrester 36, bolts 144 engage a U-shaped support 148 supported from carriage channels 78. U-shaped support 148 for arrester 36 may have tie plates 149 connecting the sides thereof for bracing purposes. Lock bolts 150 are provided for locking arresters 36 and 40 at their retracted position shown in Fig. 3 by engagement with apertures provided in channels 146 and 148, respectively, and apertures in supporting plates 87 and 102. Bolts 150 may, like the locking bolts 132 for the disconnect switches, be withdrawn and employed for locking arresters 36 and 40 at their operative extended positions by engaging in apertures 152 when these are aligned with the apertures in supporting plates 87 and 102. The lightning arrester supporting means instead of being supported directly on bed 2 of the vehicle, may be mounted on supporting channels 154 which extend transversely of bed 2 and are secured thereto.

It is believed that it will be apparent that lightning arresters 36 and 40 may be simultaneously manually operated from the retracted positions shown in Figs. 2 and 3 of the drawings where they may be locked during transit when the vehicle is being moved from one location to another, and may be unlocked and operated to an extended position where they may be locked for operation at any desired location to which they have been transported. Moreover, it can be appreciated that the amount of extension of lightning arresters 36 and 40 may be coordinated with the amount of extension of disconnect switches 6 and 10 to obtain the same electrical clearances between poles and to line up the fuse contacts 28 with terminals 34 at the top of the arresters, so that fuses 30 will find their contacts in alignment for proper operation of the fuses. Due to the provision of operating means for simultaneously extending and retracting lightning arresters 36 and 40, as is the case with disconnect switches 6 and 10, these outer poles are always the same distances from the central stationary poles, and movement to and locking at their mobile retracted position and their extended operation position can be readily and easily accomplished.

Referring to Figs. 1 and 2, it will be noted when lightning arresters 36 and 40 are at their extended operative positions, there being a ground connection 157 at the base of each arrester, that these arresters present some hazard to persons in the vicinity thereof, and to guard against this, there is provided a guard screen structure comprising a central part 156 secured to the outer ends of the carriage channels for arresters 36 and 40, with side sections 158 movable in a substantially pivotal manner with respect to central section 156, so that they can be folded towards each other in the manner shown in full lines in Fig. 2 during transit when arresters 36 and 40 are at their mobile retracted positions, and when the arresters are at their extended operative positions guard screen sections 158 may be moved outwardly to the positions shown in dot-dash lines in Fig. 2 and in full lines in Fig. 1, so that the outer ends engage adjacent walls of compartments 63 and 64, respectively, and preferably means 160 are provided for releasably retaining guard screen sections 158 at such positions.

As previously mentioned, the outgoing distribution circuit conductors are adapted to be tied to dead end brackets 58 mounted at each side of housing structure 48 of the vehicle. These brackets 58 are in the form of rods or pipes slidably mounted in guides 162 provided in the housing structure, and are notched as at 164 for receiving a lock member 166 slidable in the housing structure in a direction transversely to the direction of movement of brackets 58, so that the brackets may be locked either at the retracted position shown in full lines in Figs. 1 and 2, or at their extended operative position shown in dotted lines in Fig. 2.

Inasmuch as the distribution disconnect switches 56 are supported in open compartments at the sides of vehicle housing structure 48, they present live parts which are exposed to persons in the vicinity of the vehicle, especially when the switch blades are at their open circuit position and project a considerable distance beyond the sides of housing structure 48. Accordingly, to guard against accidental contact with such live parts, a guard screen 168 is provided at each side of housing structure 48, with each guard screen comprising a bottom wall 170 pivoted at its inner end to the housing structure, and end walls 172 all joined by a front wall 174. The front wall 174 of each guard screen is preferably provided with cutout notch portions 176 by which access may be had to the switch blades when they are at their open circuit position. The hinge for guard screens 168 is shown at 178 (Fig. 8), so that the guard screens may be pivotally moved from their extending positions shown in Fig. 1 and in dot-dash lines in Figs. 2 and 8, to a position wherein they are received in the side compartments of housing structure 48 in which disconnect switches 56 are located.

The overall mode of operation of the equipment mounted on bed 2 of the vehicle may now be reviewed, and it is believed clear from the structures which have been described that when the vehicle is adapted to be moved from one location to another, that all parts of the apparatus carried thereon can be located within the confines of the vehicle to provide adequate right-of-way clearances, such positions of the parts being illustrated in full lines in Figs. 2 to 8. With respect to the lightning arresters which are necessarily relatively tall slender structures due to the high voltages at which they are employed, for the purpose of bracing the arresters, a supporting frame 180 is adapted to be pivotally mounted as at 182 at the inner side of housing structure 48 and is provided with outer portions adapted to engage arresters 36, 38 and 40, respectively, at the position thereof shown in full lines in Fig. 1, and be secured to the adjacent flange 181 of each arrester as by flange bolts 183 (Fig. 9), to positively brace the arresters at the side thereof opposite fuses 30.

When the vehicle is brought to a location where it is desired to operate the apparatus carried thereby, it is necessary to first move fuses 30 to their open circuit position, as previously mentioned, and unlock and actuate disconnect switch poles 6 and 10 to their extended operative position and lock them in this position by means of lock bolts 132. Connecting rod structure 116 may then be secured to switch operating cranks 114 to render the switches operative by handle 128. The outside poles 36 and 40 of the lightning arresters may then be moved to their extended positions after the brace plate 130 is moved out of bracing relation with respect to the arresters, merely by manipulation of operating crank 142 in the appropriate manner and after, of course, unlocking the arresters by removal of bolts 150, after which the arresters may be locked by use of the same bolts at their extended operative positions. As soon as the arresters and switches are locked at their extended operative positions, fuses 30 may be moved to the closed circuit position, and it will then be apparent that the supply circuit previously described will be established. Moreover, after the outside poles 36 and 40 of the arresters are locked at their extended operative positions, side sections 158 of their guard screens may be moved to the dot-dash line positions shown in Fig. 2 and secured to give adequate protection for safety purposes.

Guard screens 168 for distribution disconnect switches 56 may be pivotally moved to their outwardly projecting positions shown in Fig. 1 and in dot and dash lines in Figs. 2 and 8, and dead end brackets may be unlocked from their retracted positions by pulling lock member 166 outwardly and the brackets may then be moved to their extended position and locked by insertion of lock member 166, for attachment thereto of the dead-end insulators for the distribution circuit conductors.

It is believed apparent from the foregoing that the particular arrangement of apparatus and mountings therefor on a vehicle disclosed herein are particularly adapted for the employment of higher voltages than have heretofore been possible due to the limitations imposed by right-of-way clearances. This extension into the higher voltage field is principally due to the particular mountings of the high-voltage disconnect switches and lightning arresters which permit them to be simultaneously moved from a retracted position when the vehicle is in transit, to a position wherein the outside poles thereof are exended a considerable distance beyond the sides of the vehicle for operation. It will further be apparent that use is also made in this arrangement for mounting other accessories such as safety guard screens and dead-end distribution insulator brackets for movement in a direction substantially transversely of the vehicle so that they too may be retracted to provide adequate right-of-way clearances while the vehicle is in transit, and may be extended to positions where they are best effective to perform their respective functions when the apparatus is in operation. Additionally, provision is made for coordination of certain of the extensible and retractable mountings, such as those of the disconnect switches and lightning arresters and for locking them at extended and retracted positions. Provision is also made for bracing certain of the electrical equipment (lightning arresters) when in transit, which bracing means is retractible.

Having disclosed a preferred embodiment of this invention in accordance with the patent statutes, it is desired that the invention be not limited to this particular structure, inasmuch as it will be apparent to persons skilled in this art that many changes and modifications may be made in this particular structure without departing from the broad spirit and scope of the invention. Accordingly, it is desired that the invention be interpreted as broadly as possible and that it be limited only as required by the prior art.

We claim as our invention:

1. Portable electrical apparatus comprising, a vehicle having high-voltage multi-phase electrical apparatus mounted for transport and operation thereon, certain of said apparatus mounted on said vehicle with the poles thereof adapted to be spaced transversely of said vehicle when in operation, means mounting only the outside poles of said certain apparatus for retractile and extensile movement substantially transversely of said vehicle, the inner poles of such apparatus being stationarily mounted on said vehicle, guard means adapted in operative position to project substantially transversely of said vehicle about certain of said apparatus, and said guard means being mounted on said vehicle for movement generally transversely of said vehicle, whereby in operation certain of said apparatus and guard means project laterally outwardly from said vehicle, and in transit all such projecting equipment can be retracted so as not to project substantially from the sides of said vehicle.

2. Portable electrical apparatus comprising, a vehicle having high voltage multi-phase electrical apparatus mounted for transport and operation thereon, two pieces of said apparatus being located adjacent each other along said vehicle and each having at least the same one phase thereof mounted for movement in a direction substantially transversely of said vehicle so as to be moved from a mobile retracted position to an operative position where they extend the same distances beyond the sides of said vehicle so that the adjacent terminals of such two pieces of apparatus may be substantially at the same opposed relative positions at both positions thereof, and rigid electrical connections between said adjacent terminals.

3. Portable electrical apparatus comprising, a vehicle having high voltage multi-phase electrical apparatus mounted for transport and operation thereon, multi-pole disconnect switch means located at one end of said vehicle with the poles thereof spaced transversely of said vehicle at least in operative position, lightning arresters corresponding in number with the number of poles of said switch means also spaced transversely of said vehicle when in operative position and mounted on said vehicle adjacent said switch means, at least an outer pole of said switch means and lightning arresters mounted for movement in a direction substantially transversely of said vehicle so as to be moved from a mobile retracted position to an operative position where they extend the same distances beyond the sides of said vehicle so that the adjacent terminals of such two pieces of apparatus may be substantially at the same opposed relative positions at both positions thereof, and relatively rigid electrical connections between said adjacent terminals.

4. Portable electrical apparatus comprising, a vehicle having high voltage multi-phase electrical apparatus mounted for transport and operation thereon, multi-pole disconnect switch means mounted at one end of said vehicle with the poles thereof spaced transversely of said vehicle at least in operative position, lightning arresters corresponding in number with the number of poles of said switch means also mounted on said vehicle so as to be spaced transversely of said vehicle when in operative position and mounted on said vehicle adjacent said switch means, at least an outer pole of said switch means and lightning arresters mounted for movement in a direction substantially transversely of said vehicle so as to be moved from a mobile retracted position to an operative position where they extend the same distances beyond the sides of said vehicle so that the adjacent terminals of such two pieces of apparatus may be substantially at the same opposed relative positions at both positions thereof, fuse contacts mounted on said adjacent terminals of each pole, and a fuse adapted to be mounted in the contacts of each pole.

5. Portable electrical apparatus comprising, a vehicle having high voltage multi-phase electrical apparatus mounted for transport and operation thereon, multi-pole disconnect switch means located at one end of said vehicle with the poles thereof spaced transversely of said vehicle at least in operative position, lightning arresters corresponding in number with the number of poles of said switch means also spaced transversely of said vehicle when in operative position and mounted on said vehicle adjacent said switch means, at least an outer pole of said switch means and lightning arresters mounted for movement in a direction substantially transversely of said vehicle so as to be moved from a mobile retracted position to an operative position where they extend the same distances beyond the sides of said vehicle so that the adjacent terminals of such two pieces of apparatus may be substantially at the same opposed relative positions at both positions thereof, fuse contacts mounted on said adjacent terminals of each pole, and a fuse movably mounted on one contact of each pole for movement into and out of engagement with the other contact of each pole.

6. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting at least one of the outside poles of said certain apparatus for retractile and extensile movement substantially transversely of said vehicle, the inner poles of such apparatus being stationarily mounted on said vehicle, guard means secured at one point to said movable pole, and means for releasably securing said guard means at another point to a stationary part of said vehicle when said movable pole is extended to operative position.

7. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting at least one of the outside poles of said certain apparatus for retractile and extensile movement substantially transversely of said vehicle, the inner poles of such apparatus being stationarily mounted on said vehicle, guard means movably secured to said movable pole, and means for releasably securing said guard means to stationary points on said vehicle spaced from opposite sides of said movable pole when the latter is extended to operative position.

8. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting only the outside poles of said certain apparatus for retractile and extensile movement substantially transversely of said vehicle, the inner poles of such apparatus being stationarily mounted on said vehicle, and operating means for simultaneously extending or retracting said outside poles.

9. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting only the outside poles of said certain apparatus for retractile and extensile movement substantially transversely of said vehicle, the inner poles of such apparatus being stationarily mounted on said vehicle, and means for locking said movable poles in their extended operative position and in their retracted mobile position.

10. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting at least one of the outside poles of said certain apparatus for retractile and extensile movement substantially transversely of asid vehicle, the inner poles of such apparatus being stationarily mounted on said vehicle, and means for locking said movable poles in their retracted mobile position.

11. Portable electrical apparatus comprising, a vehicle having high voltage multi-phase electrical apparatus mounted for transport and operation thereon, multi-pole disconnect switch means located at one end of said vehicle with the poles thereof spaced transversely of said vehicle at least in operative position, elongated lightning arresters corresponding in number with the number of poles of said switch means also spaced transversely of said vehicle when in operative poition, at least an outer pole of said switch means and of said lightning arresters mounted for movement in a direction substantially transversely of said vehicle so as to be moved from a mobile retracted position to an operative position where they extend the same distances beyond the sides of said vehicle so that the adjacent terminals of such two pieces of apparatus may be substantially at the same opposed relative positions at both positions thereof, the inner poles of such apparatus being stationarily mounted on said vehicle, and bracing means mounted on said vehicle for movement to and away from bracing relation with respect to said arresters when said movable poles are at their mobile retracted position.

12. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means including electrical conductors connected with the terminals of said apparatus forming a high voltage conducting circuit which extends longitudinally along the top of said vehicle and is provided with incoming and outgoing terminals at the ends of said vehicle, respectively, means for moving the incoming terminals transversely of said vehicle relatively to each other, means including conductors and other electrical apparatus on said vehicle forming a lower voltage distribution circuit having terminals below said high voltage circuit and at least at one side of said vehicle with dead end brackets adjacent each of said side terminals, respectively.

13. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means including electrical conductors connected with the terminals of said apparatus forming a high voltage conducting circuit which extends longitudinally along the top of said vehicle and is provided with incoming and outgoing terminals at the ends of said vehicle, respectively, means for moving the incoming terminals transversely of said vehicle relatively to each other, means including conductors and other electrical apparatus on said vehicle forming a lower voltage distribution circuit having terminals at least at one side of said vehicle with dead end brackets adjacent each of said side terminals, respectively, said brackets being mounted for sliding movement in a direction substantially transversely of said vehicle so as to be extended when in use and retracted when in transit, and means for securing said brackets at each position thereof.

14. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting only the outside poles of said certain apparatus for retractile and extensile movement substantially transversely of said vehicle, the inner poles of such apparatus being stationarily mounted on said vehicle, said mounting means comprising a carriage for each of said movable poles, said carriages being mounted for movement on said vehicle to and from positions where they project from opposite sides of said vehicle, respectively, and means mounted on said vehicle and engaging said carriages for simultaneously moving said carriages outwardly or inwardly with respect to the sides of said vehicle.

15. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting an outside pole of at least one of said pieces of apparatus for movement substantially transversely of said vehicle comprising a pair of spaced parallel channel beams, means connecting said beams together to form a carriage on which said movable pole is supported, roller means adjacent the same side of said vehicle as said movable pole located beneath each of said channel beams, and other roller means supported intermediate the sides of said vehicle and positioned to engage upper and lower surfaces on said channel beams for supporting said carriages and movable poles for the aforesaid transverse movement.

16. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting an outside pole of at least one of said pieces of apparatus for movement substantially transversely of said vehicle comprising a pair of spaced parallel channel beams, means connecting said beams together to form a carriage on which said movable pole is supported, grooved roller means adjacent the same side of said vehicle as said movable pole located beneath each of said channel beams, a rail strip secured to the underside of each channel beam to be received in said roller means, and other roller means supported intermediate the sides of said vehicle and positioned to receive rail strips secured to the sides of said channel beams for supporting said carriages and movable pole for the aforesaid transverse movement.

17. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting the outside poles of said certain apparatus for retractile and extensile movement substantially transversely of said vehicle, said mounting means comprising a carriage for each pole movably supported and guided on said vehicle for transverse movement with portions of each carriage overlapping at all relative positions, and a single operating means engaging the overlapping portions of said carriages for simultaneously moving said carriages outwardly or inwardly relative to said vehicle.

18. Portable electrical apparatus comprising, a vehicle having high voltage multi-phase electrical apparatus mounted for transport and operation thereon, said apparatus including multipole disconnect switch means mounted on said vehicle so that the poles thereof are spaced in a direction substantially transversely of said vehicle at least in operative position, means mounting an outer pole of said switch means for substantially transverse movement relative to said vehicle from a mobile retracted position to its operative position where it is extended beyond the adjacent side of said vehicle, motion transmitting means adapted to connect the operating means for each pole of said switch means at least during operation thereof for causing simultaneous circuit opening and closing movement thereof, and actuating means for said switch means carried by said movable pole thereof.

19. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting only the outside poles of said certain apparatus for retractile and extensile movement substantially transversely of said vehicle, the inner poles of such apparatus being stationarily mounted on said vehicle, and means responsive to movement to said retracted position for taking up any play in the mountings of said movable poles.

20. Portable electrical apparatus comprising, a vehicle having high voltage multi-phase electrical apparatus mounted for transport and operation thereon, certain of said apparatus mounted on said vehicle with the poles thereof adapted to be spaced transversely of said vehicle when in operation, means mounting at least one of the outside poles of said certain apparatus for retractile and extensile movement substantially transversely of said vehicle, the inner poles of such apparatus being stationarily mounted on said vehicle, and means responsive to movement to said retracted position for taking up any play in the mountings of said movable poles.

KENNETH A. KEPPLE.
ELMER A. ROTHFUS.

REFERENCES CITED

The following references are of record in the file of this patent:

UNITED STATES PATENTS

| Number | Name | Date |
|---|---|---|
| 1,524,579 | Schaake | Jan. 27, 1925 |
| 1,553,382 | Kennedy | Sept. 15, 1925 |
| 1,563,395 | Perkins | Dec. 1, 1925 |
| 1,818,686 | Burnham | Aug. 11, 1931 |
| 2,237,812 | De Blieux | Apr. 8, 1941 |

FOREIGN PATENTS

| Number | Country | Date |
|---|---|---|
| 143,929 | Austria | Dec. 10, 1935 |

OTHER REFERENCES

Outdoor Station Equipment—Bulletin No. 47,706B, General Electric Company, Schenectady, N. Y.; pages 45, 71, 72, 73 and 74.